(12) United States Patent
Shaffer et al.

(10) Patent No.: US 8,442,208 B2
(45) Date of Patent: May 14, 2013

(54) METHOD AND SYSTEM FOR TRANSFERRING AN AUTOMATIC CALL DISTRIBUTOR CALL

(75) Inventors: Shmuel Shaffer, Palo Alto, CA (US);
Balaji Sundara, Nashua, NH (US);
Labhesh Patel, San Francisco, CA (US);
Denise G. Caballero-McCann, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1178 days.

(21) Appl. No.: 11/210,064

(22) Filed: Aug. 23, 2005

(65) Prior Publication Data

US 2007/0064913 A1  Mar. 22, 2007

(51) Int. Cl.
*H04M 3/00* (2006.01)

(52) U.S. Cl.
USPC .............................. 379/265.02; 379/265.03

(58) Field of Classification Search ............... 379/265, 379/266, 265.01–265.03, 265.11, 266.08
See application file for complete search history.

(56) References Cited

U.S. PATENT DOCUMENTS

| | | | |
|---|---|---|---|
| 5,802,163 A | 9/1998 | Miloslavsky | 379/265 |
| 6,047,060 A * | 4/2000 | Fedorov et al. | 379/265.02 |
| 6,363,145 B1 * | 3/2002 | Shaffer et al. | 379/265.02 |
| 6,480,601 B1 | 11/2002 | McLaughlin | 379/265.11 |
| 6,650,748 B1 | 11/2003 | Edwards et al. | 379/266.04 |
| 6,704,411 B1 | 3/2004 | Nishidate | 379/265.09 |
| 7,209,891 B1 * | 4/2007 | Addy et al. | 705/21 |
| 2004/0158629 A1 * | 8/2004 | Herbeck et al. | 709/224 |
| 2005/0262006 A1 * | 11/2005 | Beartusk et al. | 705/37 |

OTHER PUBLICATIONS

Cisco Systems, Inc. publication entitled, "*Cisco IOS Service Assurance Agent for Voice Over IP*", for more information http://www.cisco.com/go/saa/, 5 pages.

Pending Patent Application entitled, "*Supervisor Intercept for Teleagent Voice Over Internet Protocol Communications*", 32 pages specification, claims and abstract, 7 pages of drawings, inventors Shaffer et al, Jul. 20, 2005.

* cited by examiner

*Primary Examiner* — Amal Zenati
(74) *Attorney, Agent, or Firm* — Baker Botts L.L.P

(57) ABSTRACT

A method for transferring an automatic call distributor call includes receiving from a caller a call for distribution to one of a plurality of agents and distributing the call to a first agent of the plurality of agents for handling. The method includes receiving a transfer request to transfer the call to a supervisor and selecting an available supervisor to receive the call. The available supervisor comprises a supervisor not in an uninterruptible state. The method includes transferring the call to the selected available supervisor.

19 Claims, 3 Drawing Sheets

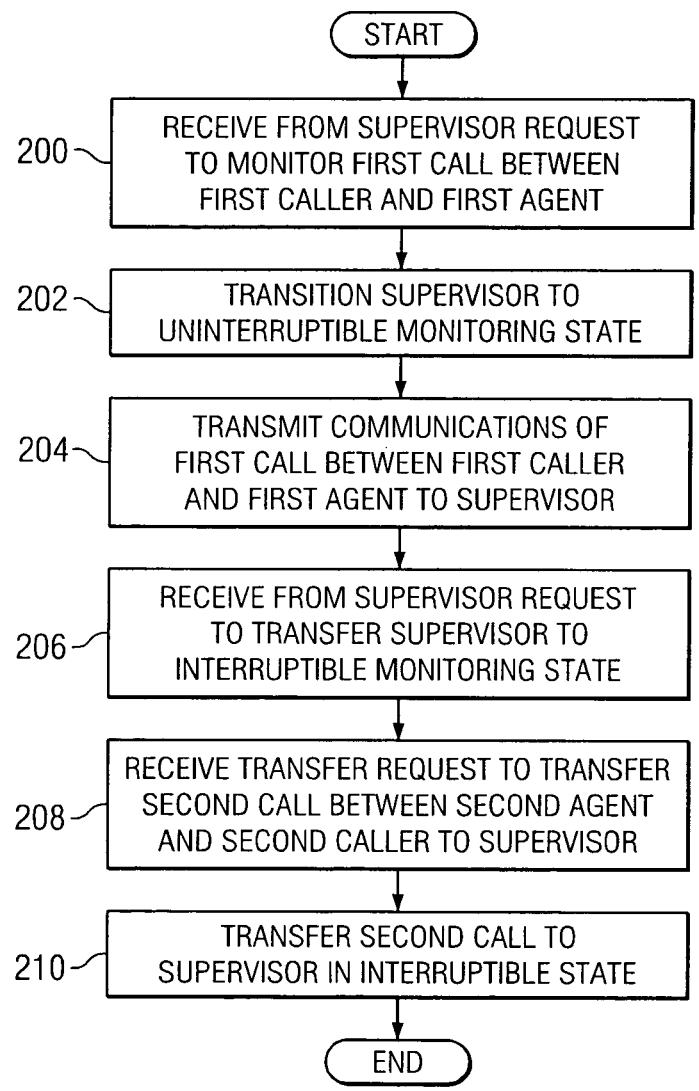

METHOD AND SYSTEM FOR TRANSFERRING AN AUTOMATIC CALL DISTRIBUTOR CALL

TECHNICAL FIELD OF THE INVENTION

This invention relates in general to communication systems and, more particularly, to a method and system for transferring an automatic call distributor call.

BACKGROUND OF THE INVENTION

Automatic call distributors (ACDs) are specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

Agents in call centers utilizing ACDs receive incoming customer calls routed to them by the ACD, or they place call center related calls to customers. In either case, whenever an agent is engaged in a call center call, the ACD system marks him as being in a "talking" state. Once the agent is identified to be in a talking state, the ACD system will not transfer any new ACD calls to the agent. Agents are expected to be available for ACD or call center incoming and outgoing calls when they are "on the job."

Call centers need to provide cost effective agent staffing in an environment in which requirements may be seasonal in nature or where special skills may be required. For example, many organizations hire more customer service representatives (CSRs or agents) between October and January to handle the increased volume of holiday shopping, processing of insurance claims or an increased load of signing up new subscribers at the end of the calendar year. Additionally, some skilled resources such as medical transcriptionists may be in short supply in a particular geographic area, and a hospital may opt to hire teleworkers. The costs avoided by the enterprise in office floor space alone can be significant. With the proliferation of broadband access (both wired and wireless) there is an increased demand for call center deployments where agents work from home. In many cases voice quality over the Internet is a concern that must be addressed.

Quality of service and call admission control services are readily available over enterprise LANs but are not as available over the Internet. Some service providers offer service level agreements (SLAs) that guarantee nominal packet loss and jitter, however the cost of these services is prohibitive for particular organizations. Some systems include means for measuring network parameters that affect voice quality over broadband connections and removing agents whose phones may exhibit poor voice quality from the pool of available agents. Network parameters may be monitored during an actual VoIP telephone call or by using synthetic traffic. If the voice quality degrades for a particular teleagent, the teleagent may be removed from the pool of available agents until voice quality improves. Alternatively the voice quality of each teleagent may be ranked according to the service provided. However, the degradation of voice quality is transient in nature, and the fact that voice quality is low at a given time is a poor predictor of the voice quality, for example, three seconds later. In addition, measuring the quality of a WAN between the agent at home and a plurality of ingress gateways may not be practical.

SUMMARY OF THE INVENTION

The present invention provides a method and system for transferring an automatic call distributor call that substantially eliminates or reduces at least some of the disadvantages and problems associated with previous methods and systems.

In accordance with a particular embodiment, a method for transferring an automatic call distributor call includes receiving from a caller a call for distribution to one of a plurality of agents and distributing the call to a first agent of the plurality of agents for handling. The method includes receiving a transfer request to transfer the call to a supervisor and selecting an available supervisor to receive the call. The available supervisor comprises a supervisor not in an uninterruptible state. The method includes transferring the call to the selected available supervisor.

The available supervisor not in an uninterruptible state may comprise an available supervisor in an interruptible monitoring state monitoring one or more calls between callers and agents. Selecting an available supervisor to receive the call may comprise selecting a first supervisor to receive the call, determining that the first supervisor is in an uninterruptible state, selecting a second supervisor to receive the call and determining that the second supervisor is in an interruptible state. The selected available supervisor may comprise the second supervisor. Receiving a transfer request to transfer the call to a supervisor may comprise monitoring the call for call quality, automatically determining a loss of call quality and initiating a transfer request based on the determined loss of call quality. The first agent may comprise a remote agent communicating on the call through a wide area network, and the transfer request may be based on a loss of quality in call communications through the wide area network.

A method for transferring an automatic call distributor call includes receiving from a supervisor a request to monitor a first call between a first caller and a first agent and transitioning the supervisor to an uninterruptible monitoring state. The method includes transmitting communications of the first call between the first caller and the first agent to the supervisor and receiving from the supervisor a request to transfer the supervisor to an interruptible monitoring state. The method also includes receiving a transfer request to transfer a second call between a second agent and a second caller to a supervisor and transferring the second call to the supervisor in the interruptible state. Transferring the second call to the supervisor in the interruptible state may comprise initiating a conference among the second caller, the second agent and the selected available supervisor.

Technical advantages of particular embodiments of the present invention include the ability to detect call quality degradation in an ACD environment and the use of "interruptible" and "uninterruptible" states for use in selecting supervisors for call transfers upon such call quality degradations. "Interruptible" and "free" supervisors may be stored in a resource group to make them available to help recover calls that are experiencing a degradation in quality. Calls with poor quality from, for example, home agents connecting to an ACD over a WAN, may be transferred to a supervisor who is on a higher quality LAN segment. Accordingly, ACD calls with quality issues may be addressed in a speedier and more efficient manner.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 4 illustrates another method for transferring an automatic call distributor call, in accordance with an embodiment of the present invention.

DETAILED DESCRIPTION OF THE INVENTION

Figure 1:
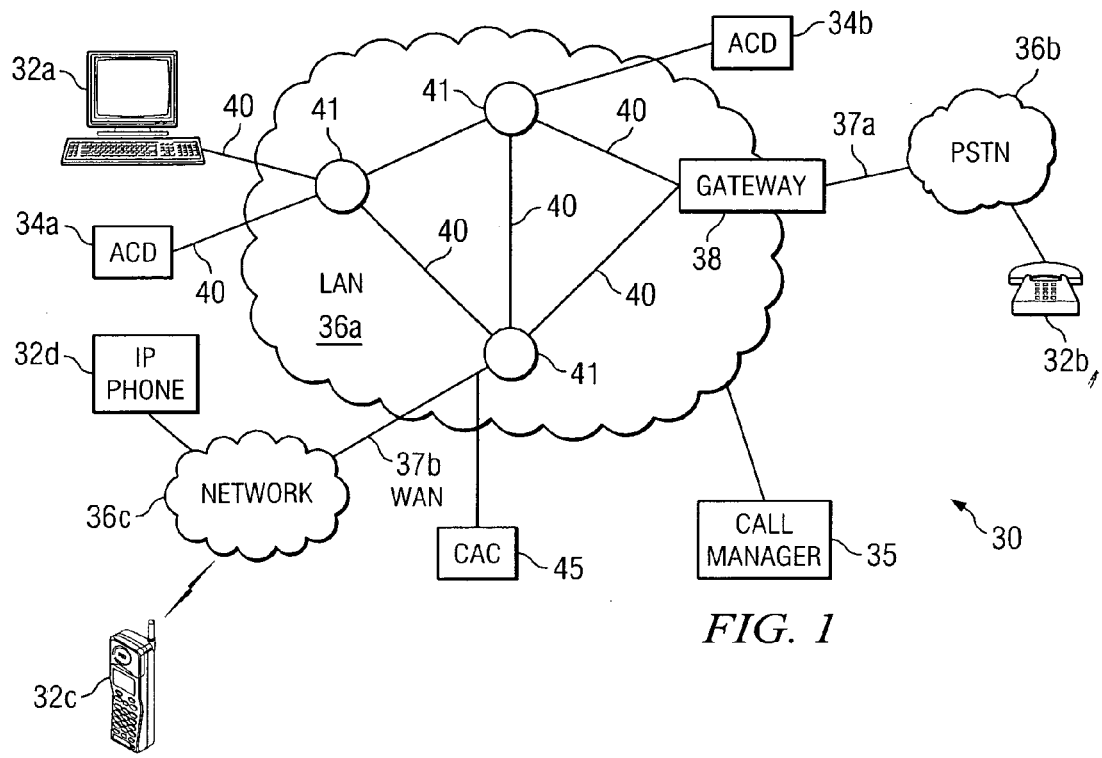
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34b, using one or more of communication networks 36a-36c. ACDs 34a-34b are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls, and "calls" shall include requests for service transmitted using any audio and/or video means, including signals, data or messages transmitted through voice devices, text chat, web sessions, facsimile, instant messaging and e-mail. ACDs 34a-34b may include call centers that receive incoming customer calls for distribution to agents and that place calls from agents to customers.

Particular embodiments use supervisor states, such as "interruptible" and "uninterruptible" states, in the selection of supervisors to handle calls having quality issues. In addition, particular embodiments include the ability to detect call quality degradation in an ACD environment. The "interruptible" and "uninterruptible" states may be used in selecting supervisors for call transfers upon such call quality degradations. "Interruptible" and "free" supervisors may be stored in a resource group to make them available to help recover calls that are experiencing a degradation in quality. Calls with poor quality from, for example, home agents connecting to an ACD over a WAN, may be transferred to a supervisor who is on a higher quality LAN segment. Accordingly, ACD calls with quality issues may be addressed in a speedier and more efficient manner. In addition, particular embodiments may help ensure that there are always enough supervisors available to take over calls with poor quality. This may be done by providing real-time statistics about the number of "free" and "interruptible" supervisors available.

Call manager 35 includes any combination of hardware, software and/or encoded logic that operates to receive and process calls to facilitate communication among agents and other users of system 30. In particular embodiments, call manager 35 may act as a private branch exchange (PBX) by supporting Internet Protocol (IP) PBX functions, such as hold, park, transfer, redirect and/or other high level and low level call management features. For the processing of calls, call manager 35 maintains information on the agents and other users of system 30. For example, call manager 35 may maintain a listing, table or other organization of information about agents of system 30. The information may include a name or other identifier for each agent. The information may also include contact information such as phone numbers and email addresses for the agents. When a call is received by call manager 35, call manager 35 and an ACD, such as ACD 34a, cooperate to receive, process and distribute the call. For example, call manager 35 and/or ACD 34a may identify one or more agents that are available to receive the call.

In the illustrated embodiment, communication network 36a is a local area network (LAN) that enables communication between a plurality of endpoints 32a-32d and ACDs 34a-34b distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b with communication network 36a through gateway 38.

Communication network 36c is a network through which agents may access an ACD 34 connected to LAN 36a, for example from a home office broadband connection from endpoints 32c or 32d. Since network 36c is connected to LAN 36a via WAN 37b, the connection between endpoints 32c and 32d may suffer from packet loss, jitter, latency, delays, echo, loss of volume and other issues. Network 36c may include one or more broadband networks operated by ISPs using an Internet backbone. For example, network 36c may include a WAN serving a local market from which endpoints 36c and 36d access an ACD 34. In some cases, such access from endpoints 36c and 36d may occur through virtual private network (VPN) functionality providing secure access between the endpoint and the ACD. The agent, using endpoints 32c or 32d to access the ACD 34, may communicate with callers requesting service from the ACD. Such callers may include, for example, callers using endpoints communicating with the ACD from other nonillustrated and illustrated networks, such as endpoint 32b using PSTN 36b.

Communication network 36c is a LAN, which couples endpoints 32c and 32d, ACD 34a and call manager 35 with communication network 36a. Accordingly, users of endpoints 32a-32d and ACDs 34a-34b can establish communication sessions between and among each network component coupled for communication with one or more of networks 36a-36c. Communication links 37a and 37b couple communication networks 36a and 36b, and communication networks 36a and 36c, respectively. A call admission control (CAC) system 45 may be used to monitor and manage the amount of bandwidth available over WAN 37b.

Communication network 36a includes a plurality of segments 40 and nodes 41 that couple endpoint 32a with ACDs 34b and 34b, gateway 38, and communication networks 36b-36c. Therefore, a user of endpoint 32a is provided with access to endpoints 32b-32d, and ACDs 34a-34b. Nodes 41 may include any combination of network components, gatekeepers, call managers, telephony servers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34b.

In a particular embodiment, communication network 36a employs voice communication protocols that allow for the addressing or identification of endpoints, nodes, and/or ACDs coupled to communication network 36a. For example, using IP, each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, ACDs 34a-34b, call manager 35, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held personal digital assistants (PDAs), or any other device capable of performing telephony functions over an IP network.

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34b, call manager 35, and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, ACDs, segments, nodes, call managers, and gateways, communication system 30 contemplates any number or arrangement of such components for communicating media.

Figure 2:
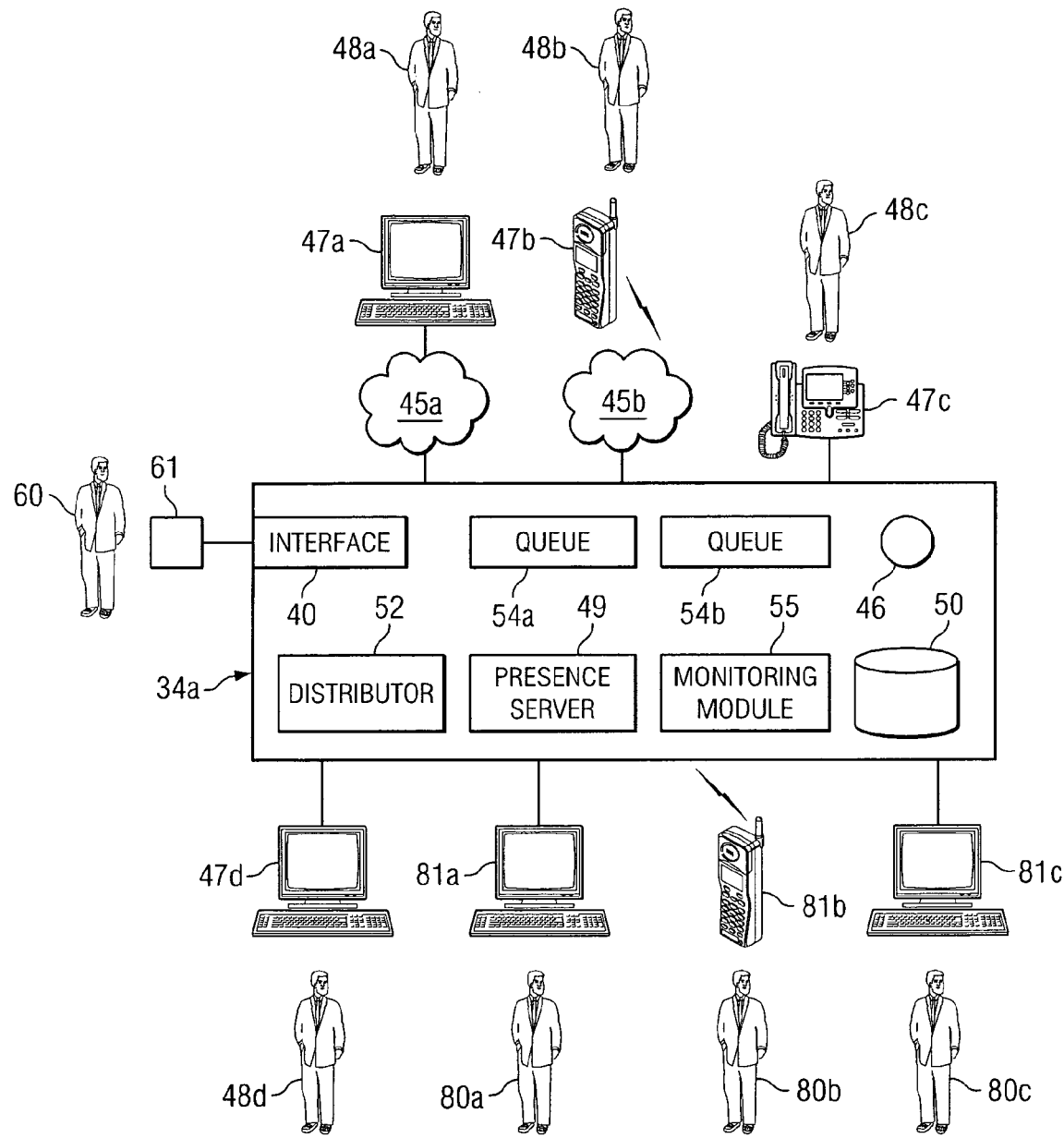
FIG. 2 illustrates an automatic call distributor of FIG. 1 in more detail, illustrating aspects of the present invention.

FIG. 2 illustrates ACD 34a in more detail, in accordance with a particular embodiment of the present invention. ACD 34a includes an interface or input ports 40 which couple ACD 34a with other components of communication system 30, such as communication network 36a. ACD 34a also includes a processor 46, presence server 49, memory module 50, distributor 52, queues 54a and 54b and monitoring module 55. The illustrated embodiment includes a caller 60 with an associated endpoint 61 used by the caller to make calls to ACD 34a. Endpoint 61 may include any particular type of endpoint, such as those discussed above with respect to FIG. 1 and may be coupled to ACD 34a through one or more communication networks, such as those discussed above with respect to communication system 30.

The illustrated embodiment also includes agents 48a-48d associated with endpoints 47a-47d, respectively, and supervisors 80a-80c associated with endpoints 81a-81c, respectively. Endpoints 47a-47d and 81a-81c may comprise any suitable endpoint, such as desktops (e.g., running a Cisco Agent Desktop or Cisco Supervisor Desktop application, as applicable), IP phones, mobile phones or other devices. In the illustrated embodiment, endpoints 47a and 47b of agents 48a and 48b are coupled to ACD 34a through networks 45a and 45b, respectively. Networks 45a and 45b may comprise networks similar to network 36c of FIG. 1. Thus, agents 48a and 48b may access ACD 34a from a home office or other broadband connection that communicates with ACD 34a via a WAN or lower bandwidth network that may present voice or data quality issues such as packet loss, jitter, latency, delays, echo, loss of volume and other issues. In contrast, agents 48c and 48d and supervisors 80a-80c may access ACD 34a directly through a LAN. This is similar to accessing ACD 34a via LAN 36a using endpoint 32a in FIG. 1. Thus, agents 48c and 48d are less likely to encounter communication quality degradation issues than agents 48a and 48b who access the ACD through a WAN.

When a call is received for processing by ACD 34a, processor 46 may be used to determine whom of a plurality of agents 48a-48d should receive the call using endpoints 47a-47d, respectively. The identification of the available agent may be made by considering the presence information relating to the availability of agents 48a-48d with respect to ACD 34a and communication system 30. Additionally or alternatively, the identification of the available agent may be made by considering agent information maintained by call manager 35 of communication system 30.

Processor 46 may be a microprocessor, controller or any other suitable computing device, resource or combination of hardware, software, and/or encoded logic that allows processor 46 to, either alone or with other ACD components, provide the functionality of ACD 34a described herein. Memory module 50 may be any form of volatile or non-volatile memory including, without limitation, magnetic media, optical media, random access memory (RAM), read-only memory (ROM), removable media or any other suitable local or remote memory component. Memory module 50 may include and store any suitable information needed for ACD 34a to perform the functionality described herein. For example, memory module 50 may include information associated with call quality issues and supervisor states, such as a list of supervisors currently free or in an interruptible state that may be selected for call transfers.

Monitoring module 55 may be any combination of hardware, software and/or encoded logic and works in conjunction with processor 46 to monitor quality of ACD call communications. Monitoring module 55 and processor 46 may detect degradation in quality of call communications, such as packet loss, jitter, latency, delays, echo, loss of volume and other issues. In some embodiments, monitoring module 55 may comprise software executed by processor 46.

Presence server 49 may be any combination of hardware, software and/or encoded logic, and is used to monitor the presence of agents 48 at endpoints 47 and supervisors 80 at endpoints 81. Presence server 49 may include a single computer or a group of computers that are capable of detecting the presence of agents and supervisors at endpoints (e.g., at times in connection with presence client applications running on the endpoints), for example, at the agent's PC, phone, PDA, or any other presence client device. Examples of presence servers include presence servers as defined by IETF specifications.

ACD 34a uses processor 46 and presence server 49 to monitor conditions of ACD 34a, such as the number, type or characteristics of calls in queues 54 or the "state" of each agent 48 or supervisor 80. Agents 48 may be placed in various states, such as a "ready" state, a "not ready" state and a "talking" state, according to their current status with respect to the ACD. For example, an agent 48 in a "ready" state may be ready and able to accept an incoming call distributed by ACD 34a. Conversely, an agent 48 in a "not ready" state may be away from his desk or otherwise not ready to accept an incoming call, and an agent in a talking state may be communicating on a previously established ACD-related or customer-related call. In addition, supervisors 80 may be placed in various states, such as "uninterruptible" and "interruptible" states. For example, if a supervisor 80 is currently monitoring another call being handled by an agent 48 and does not wish to be interrupted with another issue, the supervisor may place himself in an "uninterruptible monitoring state." While in this state the supervisor may not receive other calls or otherwise be bothered by ACD issues. If, on the other hand, the supervisor is in an interruptible state, the supervisor may receive other calls or otherwise be bothered by ACD issues. For example, the ACD may automatically forward various issues to the supervisor for handling according to system configuration and instructions.

Voice quality issues, including those arising from a lower quality connection between an agent such as agents 48a and 48b accessing ACD 34a via a WAN, can typically be classified into two categories: persistent and transient. Particular embodiments focus on enhancing the experience of ACD customers in the face of transient WAN issues (e.g., packet loss, jitter, etc.). Persistent WAN issues may be addressed through permanent fixes. Some methods address these issues in a call-by-call approach rather than by taking agents with connection problems out of a list of available agents. However, call centers may not want to automatically take out their agents when the call volume is at its peak.

ACD supervisors 80 are routinely involved in monitoring conversations between agents and customers. If a supervisor 80 finds that a given agent is providing substandard treatment to a customer, the supervisor can invoke a "call interception" feature and transfer the call away from the agent to the supervisor's endpoint. For example, if supervisor 80a initiated a call interception with respect to a call from caller 60 currently being handled by agent 48a via endpoint 47a, ACD 34a, through processor 46 or otherwise, would connect endpoint 81a associated with supervisor 80a with endpoint 61 of caller 60 to enable supervisor 80a to handle the call. Agent 48a may or may not remain on the call with caller 60 and supervisor 80a, depending on the particular situation and operational desires. When the need arises, supervisors can assume the role of an agent and handle incoming calls.

As indicated above, particular embodiments utilize various states for ACD supervisors. A supervisor 80 who is monitoring an agent can be designated as being in either an interruptible or an uninterruptible monitoring state. A supervisor may mark himself as being in an "interruptible monitoring" state if the supervisor is monitoring calls, such as when he is browsing randomly through calls between callers and agents 48. When a supervisor would like to listen to a specific call without being disturbed, the supervisor may mark himself as being in an "uninterruptible monitoring state." In some cases, as a supervisor starts monitoring a discussion between an agent and a caller, his state may be set to "interruptible monitoring." If the supervisor would like to stay with the ongoing call, he may need to transition his state to an "uninterruptible monitoring state." Endpoints 81 may include a soft-key or other interface from which the supervisor can manually transition himself between any supported states. For example, a supervisor 80 may transfer himself from an "interruptible monitoring" state to an "uninterruptible monitoring" state by pressing an appropriate key or button on the supervisor's endpoint 81. In some embodiments, presence server 49 may automatically transition a supervisor 80 between states based on a characteristic of the supervisor 80 or according to what the supervisor is currently doing, such as randomly monitoring calls. In some embodiments, the transitioning of a supervisor 80 between states may include a combination of manually implemented and automatically implemented transitions. Accordingly, and as described above, presence server 49 and/or processor 46 may automatically transition a supervisor 80 to an "uninterruptible monitoring" state when the supervisor starts listening in on a call between a caller and an agent 48. If, however, the supervisor determines based on listening to the call that he no longer needs to monitor the call because there are no significant quality issues, the supervisor may manually transition himself to an "interruptible monitoring" state. In some cases, if the supervisor intercepts a call and is handling it as any other agent would, the supervisor's state may be automatically transitioned to a "talking—uninterruptible" state.

In some embodiments, supervisors and other ACD personnel may be presented with real-time reports indicating the number of supervisors in "interruptible" and "uninterruptible" states. Supervisors may be requested to maintain a predefined or a preconfigured number of supervisors in an "interruptible" state. If the number falls below the predefined threshold, ACD 34a may notify the supervisors of this event, for example through a graphical user interface (GUI) with red numbers, whisper or through another method.

In particular embodiments, calls may be monitored for a degradation in quality. Various call characteristics can be checked such as jitter, latency, delays, echo, loss of volume and other characteristics. Such monitoring or checking can be automated or can rely in whole or in part on human participation. For example, monitoring module 55 may automatically monitor some or all communications between agents and callers for degradation in quality. Once quality degradation is detected, processor 46 and/or monitoring module 55 may initiate a request for call transfer to a supervisor 80. Additionally, a supervisor 80 can listen in to detect the quality of a voice call between caller 60 and an agent 48. The supervisor 80 may monitor calls on a routine (e.g., random, round-robin) basis. Supervisor monitoring can also be automatically initiated by a process or device that detects loss of quality on a call or through other approaches. Moreover, agents 48 currently handling their calls may monitor and notice degradations in quality of call communications. When monitoring detects undesirable quality, such as degradation in a characteristic of voice transmission, then a signal is generated—again either manually or automatically. The signal, referred to as a "voice quality alert," can be initiated by a button on an endpoint, such as an endpoint 47 of an agent 48 or an endpoint 81 of a supervisor 80. The signal can be conveyed in Extended Markup Language (XML) format or in any other format or as any type of suitable signal. An alert signal can include an email message, instant messaging, chat, or other type of electronic communication including a light, displayed image, tone, alarm, speech, etc.

As indicated above, in particular embodiments, agents may monitor their interactions with customers for degradation in voice quality. For example if a caller asks an agent to repeat what he said or if the agent has a hard time understanding what the caller said because the voice becomes robotic or metallic, the agent may conclude that the WAN is experiencing a transient situation that may be affecting the quality of the caller's service. In particular embodiments, if an agent detects a transient degradation of voice quality over the WAN, he may communicate a request for intercept or voice quality alert through, for example, any suitable interface such as a soft key or button. As a result, ACD 34a selects a supervisor 80 who may be either ready or in an "interruptible monitoring" state, automatically intercepts the call and transfers it to the selected supervisor.

In some embodiments, the supervisor may be moved to a barge-in state pursuant to which the supervisor will be conferenced with the agent and the caller in, for example, a 3-way conference. In some embodiments, ACD 34a may comprise a multi-point conference unit (MCU) to accomplish the conference. The supervisor may be required to manually complete the interception. In some embodiments, the agent may complete the supervisor interception by hanging up on the call. Once a call has been intercepted, data associated with the call, the caller and/or the caller's enterprise or account may be transferred to the supervisor who then assumes the role of an agent.

In some embodiments, a more automated operation may be used. For example, the quality of voice communications may be measured at the endpoints (agent's VoIP phone and the egress GW port) or at the ACD by monitoring module 55 and/or processor 46. Specifically, voice quality indicators such as echo, jitter, delay and packet loss may be measured. If ACD 34a detects degradation of voice quality below a pre-defined threshold, the ACD may select a supervisor who may be either ready or in the "interruptible monitoring" state. The ACD may automatically intercept the call and transfer it to the selected supervisor. In some embodiments, the supervisor may be moved to the barge-in state (e.g., engage in a 3-way conference state) and may be conferenced with the agent and the caller. The supervisor may be required to manually complete the interception.

Although various embodiments discuss transfer of calls encountering quality loss to supervisors, such as supervisors 80 connected to ACD 34a directly over a LAN, it should be understood that particular embodiments may utilize similar functionality to transfer such calls to agents, such as agents 48c and 48d connected to ACD 34a directly over a LAN and providing back up for agents 48a and 48b connected to ACD 34a over a WAN.

As an additional example in operation, agent 48b, connected to ACD 34a remotely through a WAN, is in an available and ready state and is selected by ACD 34a business rules logic to receive a call from caller 60 (e.g., through logic executed by processor 46). Distributor 52 distributes the call to the agent for handling. Agent 48b, either through an auto-answer state, by clicking on an answer button, by lifting a handset or by other means answers the call.

During the call with caller 60, agent 48b experiences voice quality problems, such as jitter, latency, delays, echo, poor volume, or other problems. Agent 48b clicks on a "Request for Intercept" button on his endpoint 47b which sends an XML trigger that notifies a supervisor 80 or another substitute agent (e.g., remote agent 48a or agent 47c or 47d) of a quality problem. As another example, agent 48b could click on a computer telephony integration desktop button that sends the same notification to the supervisor or another substitute agent of the quality problem.

ACD 34a, for example through processor 46, selects a supervisor 80 from a list of either "free" supervisors or supervisors who are in an "interruptible monitoring" state. The selected supervisor 80 is brought into the call in a barge-in state. As another example, ACD 34a may automatically intercept the call and transfers it to the selected supervisor. The call continues with the selected supervisor, the voice quality is not sacrificed and the customer call is attended to in real-time.

It will be recognized by those of ordinary skill in the art that ACD 34a may include any number of processors, memory modules or other components to accomplish the functionality and features described herein. The processors 46, memory modules 50, presence server 49, distributor 52, queues 54 and monitoring module 55 associated with ACD 34a may be centrally located (local) with respect to one another, or distributed throughout communication network 36a.

Figure 3:
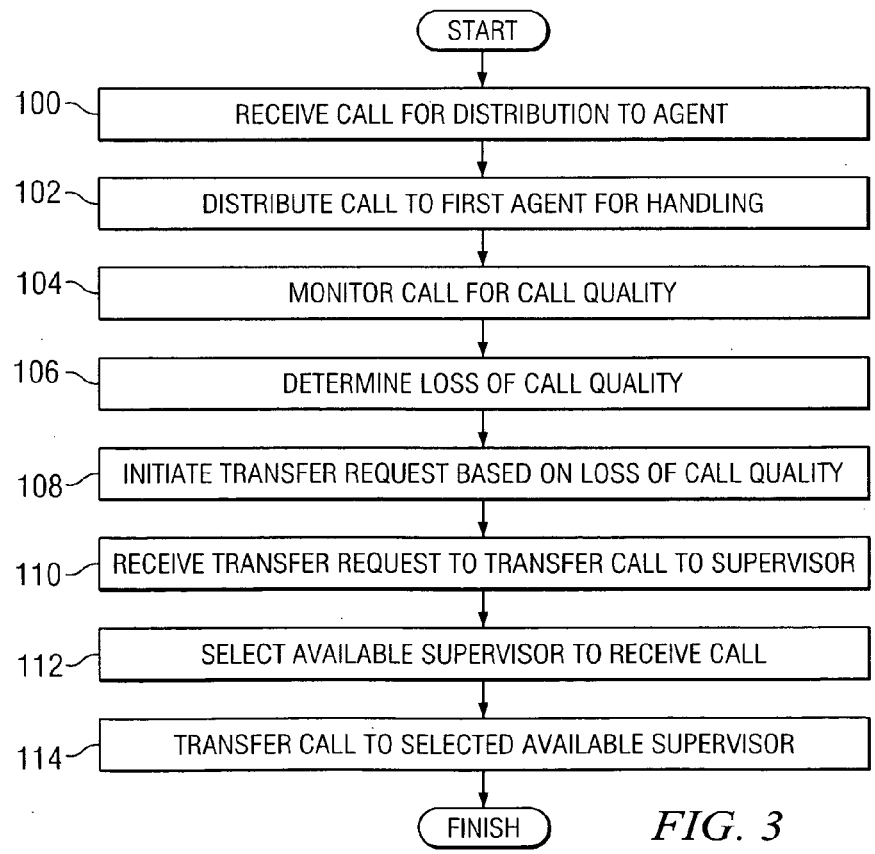
FIG. 3 illustrates a method for transferring an automatic call distributor call, in accordance with an embodiment of the present invention.

FIG. 3 is a flowchart illustrating a method for transferring an ACD call, in accordance with a particular embodiment. The method begins at step 100 where a call is received from a caller for distribution to an agent of a plurality of agents. At step 102, the call is distributed to a first agent of the plurality of agents for handling. At step 104, the call is monitored for call quality. Call communications between the first agent and the caller may be monitored by a monitoring module and/or a processor. In some cases, the first agent or a supervisor may monitor such communications. At step 106, it is determined that a loss of call quality exists by, for example, the monitoring module/processor, the first agent or a supervisor. For example, a loss of call quality may comprise packet loss, jitter, latency, delays, echo, loss of volume or other quality degradation characteristics. In some cases, these quality degradation characteristics may occur as a result of the first agent accessing an ACD (and thus transmitting and receiving the call communications) over a WAN.

At step 108, a transfer request is initiated based on the determined loss of call quality. In some cases, such request may be made by the processor/monitoring module, the first agent or a supervisor. At step 110, the transfer request to transfer the call to a supervisor is received. The steps comprising the initiation of the transfer request and the receipt of the request may essentially be the same if the transfer request is initiated by an internal ACD component (e.g., automatically), such as a component that determines the loss of call quality. At step 112, an available supervisor is selected to receive the call. An available supervisor may comprise a supervisor not in an uninterruptible state, such as a supervisor in an interruptible monitoring state currently monitoring one or more calls between callers and agents. An ACD component may review a list of potential supervisors in order to determine those who are free or in an interruptible state for possible selection. At step 114, the call is transferred to the selected available supervisor for handling as a result of the call communication quality issues. Such transfer may comprise initiating a 3-way conference between the first agent, the caller and the selected supervisor. As indicated above, in some cases the supervisor may then be marked as "uninterruptible."

In some cases, upon the transfer request, a first supervisor may be selected to receive the call. Then it may be determined that the first supervisor is in an uninterruptible state. Next, a second supervisor may be selected to receive the call. After determining that the second supervisor is in an interruptible state, the call may be transferred to the second supervisor.

FIG. 4 is a flowchart illustrating a method for transferring an ACD call, in accordance with a particular embodiment. The method begins at step 200 where a request is received from a supervisor to monitor a first call between and first caller and a first agent. The request may be received by an ACD. In response, the ACD may allow the supervisor to participate or just listen in on communications of the first call. At step 202, the supervisor is transitioned to an uninterruptible monitoring state. Such transfer may be performed automatically by, for example, an ACD processor in response to the supervisor monitoring the first call. At step 204, communications of the first call are transmitted to the supervisor for monitoring.

At step 206, a request is received from the supervisor to transfer the supervisor's state to an interruptible monitoring state. For example, the supervisor may make this state change request while monitoring the first call. He may make this request if he feels, based on first call communications, that monitoring the first call should not take precedent over other potential ACD issues that may arise, such as call transfer issues. The supervisor's state may thus be changed to an interruptible monitoring state. At step 208, a request may be received to transfer a second call between a second agent and a second caller to a supervisor. This request may be made automatically by the ACD, by the second agent or by other personnel as a result of call quality issues in the second call such as issues arising from the second agent accessing the ACD over a WAN from home. At step 210, the second call is transferred to the supervisor in the interruptible monitoring state for handling.

Some of the steps illustrated in FIGS. 3 and 4 may be combined, modified or deleted where appropriate, and additional steps may also be added to the flowcharts. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 34a, these elements may be combined, rearranged or positioned in order to accommodate particular routing architectures or needs. In addition, any of these elements may be provided as separate external components to communication system 30, automatic contact distributor 34a or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for transferring an automatic call distributor call, comprising: receiving from a caller a first call for distribution to one of a plurality of agents;
   distributing the first call to a first agent of the plurality of agents for handling;
   receiving a transfer request to transfer the first call to an available supervisor;
   receiving, prior to receiving the transfer request, a state designation of an interruptible monitoring state from one or more of a plurality of supervisors, the interruptible monitoring state comprising a supervisor that is listening to a call and can be interrupted to listen to another call;
   selecting, according to the received state designation from the one or more of the plurality of supervisors, a first available supervisor to receive the first call, wherein the first available supervisor is in the interruptible monitoring state;
   transferring the first call to the first available supervisor;
   in response to transferring the first call to the first available supervisor, automatically transition the first available supervisor from the interruptible monitoring state to an uninterruptible monitoring state comprising a supervisor that is listening to a call and cannot be interrupted to listen to another call;
   determining, in real time, a number of supervisors not in the uninterruptible monitoring state;
   determining that the number of supervisors not in the uninterruptible monitoring state is below a predetermined threshold; and
   notifying one or more supervisors that the number of supervisors not in the uninterruptible monitoring state is below the predetermined threshold.

2. The method of claim 1, wherein selecting a first available supervisor to receive the call comprises:
   selecting a first supervisor to receive the first call;
   determining that the first supervisor is in the uninterruptible state;
   selecting a second supervisor to receive the first call; and
   determining that the second supervisor is in the interruptible state; and
   wherein the first available supervisor comprises the second supervisor.

3. The method of claim 1, wherein receiving a transfer request to transfer the first call to an available supervisor comprises receiving from the first agent the request to transfer the call to a supervisor based on a loss of call quality.

4. The method of claim 1, wherein receiving a transfer request to transfer the first call to an available supervisor comprises:
monitoring the first call for call quality;
automatically determining a loss of call quality; and
initiating the transfer request based on the determined loss of call quality.

5. The method of claim 1, wherein:
the first agent comprises a remote agent communicating on the first call through a wide area network; and
the transfer request is based on a loss of quality in call communications through the wide area network.

6. The method of claim 1, wherein transferring the first call to the first available supervisor comprises initiating a conference among the caller, the first agent and the first available supervisor.

7. A method for transferring an automatic call distributor call, comprising:
receiving from a supervisor a request to listen to a first call between a first caller and a first agent;
transmitting communications of the first call between the first caller and the first agent to the supervisor;
in response to transmitting the first call to the supervisor, transitioning the supervisor to an uninterruptible monitoring state, the uninterruptible state comprising a state in which the supervisor is listening to one call and cannot be interrupted with another call;
receiving from the supervisor a designation of an interruptible monitoring state while the supervisor continues to receive communications of the first call;
transitioning the supervisor to the interruptible monitoring state, the interruptible state comprising a state in which the supervisor is listening to the first call but can be interrupted with another call;
receiving a transfer request, after receiving the designation of the interruptible state, to transfer a second call between a second agent and a second caller to a supervisor;
determining, according to the received state designation of the supervisor, to transfer the second call to the supervisor in the interruptible monitoring state;
transferring the second call to the supervisor in the interruptible monitoring state;
determining, in real time, a number of supervisors not in the uninterruptible monitoring state;
determining that the number of supervisors not in the uninterruptible monitoring state is below a predetermined threshold; and
notifying one or more supervisors that the number of supervisors not in the uninterruptible monitoring state is below the predetermined threshold.

8. The method of claim 7, wherein transferring the second call to the supervisor in the interruptible state comprises initiating a conference among the second caller, the second agent and the supervisor.

9. The method of claim 1, wherein the interruptible monitoring state comprises a state in which a supervisor may receive transfer of a call that the supervisor is not currently monitoring.

10. A system for transferring an automatic call distributor call, comprising:
an interface operable to receive from a caller a first call for distribution to one of a plurality of agents;
a distributor coupled to the interface and operable to distribute the first call to a first agent of the plurality of agents for handling;
the interface operable to: receive a transfer request to transfer the first call to an available supervisor; and
receive, prior to receiving the transfer request, a state designation of an interruptible monitoring state from one or more of a plurality of supervisors, the interruptible monitoring state comprising a supervisor that is listening to a call and can be interrupted to listen to another call;
a processor coupled to the distributor and operable to:
select, according to the received state designation from the one or more of the plurality of supervisors, an available supervisor to receive the first call, wherein the first available supervisor is in the interruptible monitoring state;
transfer the first call to the first available supervisor;
in response to transferring the first call to the first available supervisor, automatically transition the first available supervisor from the interruptible monitoring state to an uninterruptible monitoring state comprising a supervisor that is listening to a call and cannot be interrupted to listen to another call;
determine, in real time, a number of supervisors not in the uninterruptible monitoring state;
determine that the number of supervisors not in the uninterruptible monitoring state is below a predetermined threshold; and
notify one or more supervisors that the number of supervisors not in the uninterruptible monitoring state is below the predetermined threshold.

11. The system of claim 10, wherein a processor operable to select a first available supervisor to receive the call comprises a processor operable to:
select a first supervisor to receive the first call;
determine that the first supervisor is in the uninterruptible state;
select a second supervisor to receive the first call; and
determine that the second supervisor is in the interruptible state; and
wherein the first available supervisor comprises the second supervisor.

12. The system of claim 10, wherein a processor operable to receive a transfer request to transfer the first call to an available supervisor comprises a processor operable to receive from the first agent the request to transfer the call to a supervisor based on a loss of call quality.

13. The system of claim 10, wherein a processor operable to receive a transfer request to transfer the first call to an available supervisor comprises a processor operable to:
monitor the first call for call quality;
automatically determine a loss of call quality; and
initiate the transfer request based on the determined loss of call quality.

14. The system of claim 10, wherein:
the first agent comprises a remote agent communicating on the first call through a wide area network; and
the transfer request is based on a loss of quality in call communications through the wide area network.

15. The system of claim 10, wherein a processor operable to transfer the first call to the first available supervisor comprises a processor operable to initiate a conference among the caller, the first agent and the first available supervisor.

16. A system for transferring an automatic call distributor call, comprising a processor operable to:
receive from a supervisor a request to listen to a first call between a first caller and a first agent;
transmit communications of the first call between the first caller and the first agent to the supervisor;

in response to transmitting the first call to the supervisor, transition the supervisor to an uninterruptible monitoring state, the uninterruptible state comprising a state in which the supervisor is listening to one call and cannot be interrupted with another call;

receive from the supervisor a designation of an interruptible monitoring state while the supervisor continues to receive communications of the first call;

transition the supervisor to the interruptible monitoring state, the interruptible state comprising a state in which the supervisor is listening to the first call but can be interrupted with another call;

receive a transfer request, after receiving the designation of the interruptible state, to transfer a second call between a second agent and a second caller to a supervisor;

determine, according to the received state designation of the supervisor, to transfer the second call to the supervisor in the interruptible monitoring state;

transfer the call to the supervisor in the interruptible monitoring state;

determine, in real time, a number of supervisors not in the uninterruptible monitoring state;

determine that the number of supervisors not in the uninterruptible monitoring state is below a predetermined threshold; and notify one or more supervisors that the number of supervisors not in the uninterruptible monitoring state is below the predetermined threshold.

17. The system of claim 16, wherein a processor operable to transfer the second call to the supervisor in the interruptible state comprises a processor operable to initiate a conference among the second caller, the second agent and the selected available supervisor.

18. A system for transferring an automatic call distributor call, comprising:

means for receiving from a caller a first call for distribution to one of a plurality of agents;

means for distributing the first call to a first agent of the plurality of agents for handling;

means for receiving a transfer request to transfer the first call to an available supervisor;

means for receiving, prior to receiving the transfer request, a state designation of an interruptible monitoring state from one or more of a plurality of supervisors, the interruptible monitoring state comprising a supervisor that is listening to a call and can be interrupted to listen to another call;

means for selecting, according to the received state designation from the one or more of the plurality of supervisors, a first available supervisor to receive the first call, wherein the first available supervisor is in the interruptible monitoring state;

means for transferring the first call to the first available supervisor;

means for automatically transitioning the first available supervisor from the interruptible monitoring state to an uninterruptible monitoring state comprising a supervisor that is listening to a call and cannot be interrupted to listen to another call in response to transferring the first call to the first available supervisor;

means for determining, in real time, a number of supervisors not in the uninterruptible monitoring state;

means for determining that the number of supervisors not in the uninterruptible monitoring state is below a predetermined threshold; and means for notifying one or more supervisors that the number of supervisors not in the uninterruptible monitoring state is below the predetermined threshold.

19. Logic embodied in a non-transitory computer readable medium, the non-transitory computer readable medium comprising code operable to:

receive from a caller a first call for distribution to one of a plurality of agents;

distribute the first call to a first agent of the plurality of agents for handling;

receive a transfer request to transfer the first call to an available supervisor;

receive, prior to receiving the transfer request, a state designation of an interruptible monitoring state from one or more of a plurality of supervisors, the interruptible monitoring state comprising a supervisor that is listening to a call and can be interrupted to listen to another call;

select, according to the received state designation from the one or more of the plurality of supervisors, a first available supervisor to receive the first call, wherein the first available supervisor is in the interruptible monitoring state; transfer the first call to the first available supervisor;

in response to transferring the first call to the first available supervisor, automatically transition the first available supervisor from the interruptible monitoring state to an uninterruptible monitoring state comprising a supervisor that is listening to a call and cannot be interrupted to listen to another call;

determine, in real time, a number of supervisors not in the uninterruptible monitoring state;

determine that the number of supervisors not in the uninterruptible monitoring state is below a predetermined threshold; and notify one or more supervisors that the number of supervisors not in the uninterruptible monitoring state is below the predetermined threshold.

* * * * *